3,504,337
APPARATUS FOR INDICATING SAFE DRIVING
Adolphe Ekman, 4 Rue de Bourgogne,
Lille, France
Filed June 20, 1966, Ser. No. 558,772
Claims priority, application France, June 18, 1965,
21,520; Dec. 29, 1965, 44,246
Int. Cl. B06q 1/00, 9/00; G08b 5/22
U.S. Cl. 340—53                                   12 Claims

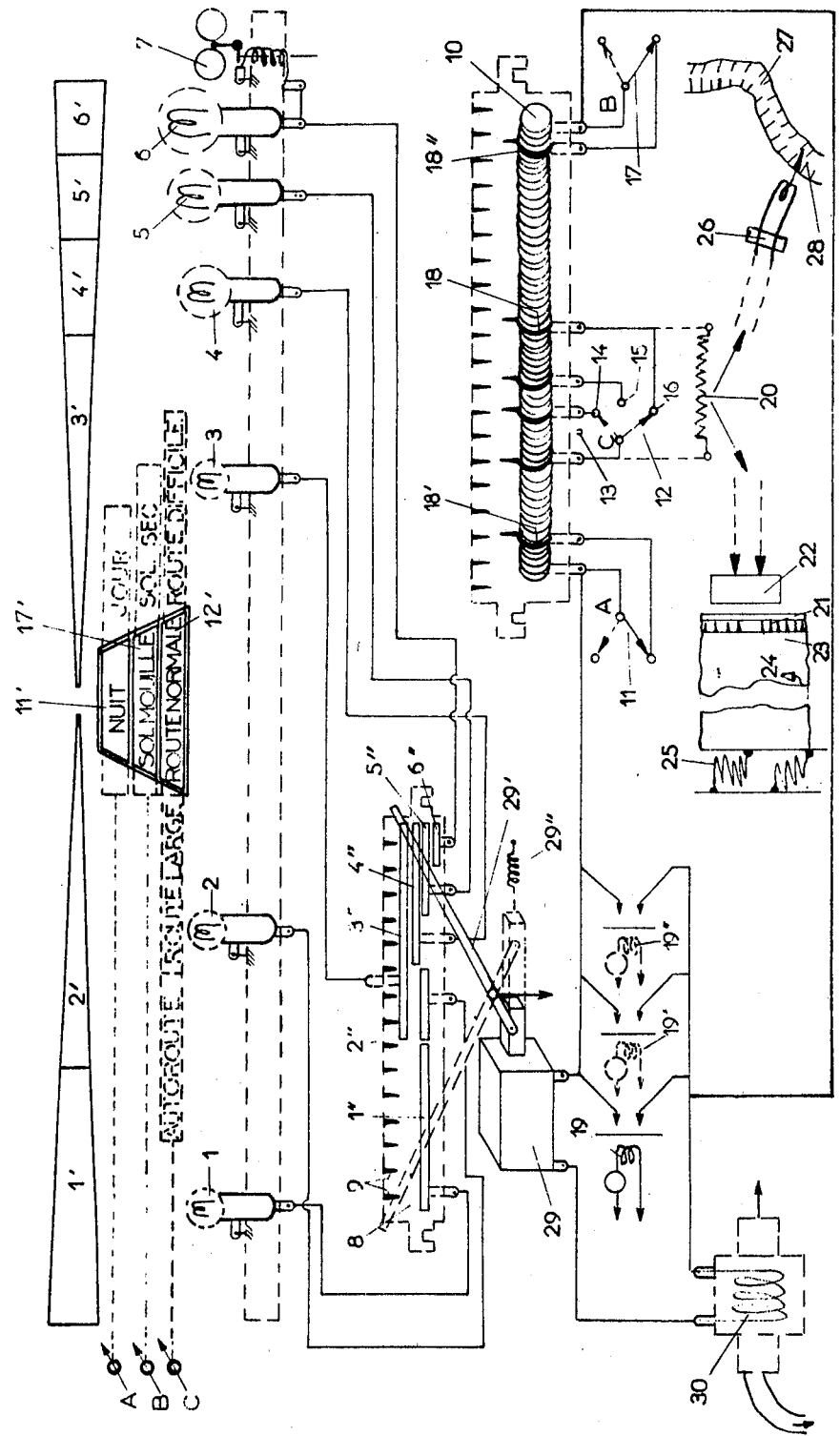

ABSTRACT OF THE DISCLOSURE

An apparatus for indicating the degree of safe driving of an automobile vehicle is described as having at least one indicator lamp and a circuit for turning the lamp on and off, a displaceable switch device with at least one contact corresponding to the lamp, a commutator device and the contact being disposed in the electric circuit; an electromagnet connected to the commutator device for controlling the position of the commutator device in a manner dependent upon the current supplied to the electromagnet; the supply current being provided by a generator driven at a speed proportional to the speed of the vehicle and means for varying the supply current according to the safety conditions affecting the vehicle.

---

The present invention relates to a control and safety device, especially but not exclusively for an automobile, permitting the user to be informed at any moment on the degree of safety of his vehicle as a function of the speed which he is travelling and on the excess of his speed with respect to the optimal speed, taking into account the circumstances and conditions peculiar to the route, the atmospheric conditions, the vehcile itself and the physical capacities of the driver.

The data furnished by automobile manufacturers on the performance characteristics of the cars of their manufacture constitute only general information on the maximal speed, power, braking distance etc. This information does not take into account the physical capacities of the driver (sight, reflexes etc.) or the concrete and real conditions met by the driver in the use of the vehicle, conditions which vary particularly according to profile and the configuration of the route to be travelled, the quality of the surface, the atmospheric conditions, the lighting and finally the degree of wear of the vehicle, when the latter has already reached a certain mileage.

The user must take into account at each instant the particular conditions of the route; he must make a constant estimate of all this data to determine the speed that he can obtain with his vehicle without exceeding the reasonable limits of safety. Nevertheless this appreciation remains essentially subjective and the appreciation of the speed to travel remains very empirical. According to the case, some drivers will maintain the vehicle well below the optimal speed, which will keep them from achieving a satisfactory average speed; on the contrary other drivers, above all inexperienced drivers, can commit grave errors of appreciation of the elements of the route, for example the radius of a bend or the adhesion of the vehicle to the roadway, and in these conditions the driver will be led to exceed the limit of safety considerably without having any consciousness of the fact. No doubt the indicator panels put in place by the roadway authorities serve to inform the users on accidents of the route which they are going to meet; however these road signs can escape the attention of a driver principally at night, and their proliferation decreases the interest that they carry for drivers. Finally they only give information on the permanent data of the route (turns, bad surface, etc.) but do not inform the user on the causes of unsafety taking into account the meteorological conditions (rain, etc.).

The present invention aims to remedy these inconveniences and provides apparatus for indicating the degree of safety of an automobile comprising at least one electric indicator lamp and an electric circuit for lighting and extinguishing said lamp, a displaceable commutator device cooperating with at least one contact corresponding to said lamp, said commutator device and said contact being disposed in said electric circuit, an electromagnet connected to said commutator device for controlling the position of the commutator device as a function of the supply current to the electromagent, said supply current being provided by a generator driven at a speed proportional to the speed of the automobile, and means for varying said supply current according to the conditions of safety affecting the automobile.

Preferably the apparatus can be adjusted to take into account the physical capacities of the driver, and means are provided to vary the indication of the degree of safety in dependence on the exterior conditions, such as the type of road being travelled, the light and the meteorological conditions, as well as on the state of the vehicle with respect to its principal weak points.

In one embodiment, means can be provided which act directly on the speed of the vehicle and/or means signalling this vehicle to other users.

For a better understanding of the invention, by way of a non-limiting example, one embodiment of the apparatus has been shown schematically on the accompanying drawing and described hereafter. In the drawing the letters A—A, B—B and C—C indicate points connected respectively with one another.

The apparatus comprises a series of luminous and/or audio signals put in contact progressively, or possibly simultaneously, by an electromagnet 29 whose core is displaced, against the effect of a return spring 29″, under the action of a variable current supplied by a generator 30 controlled at a speed proportional to that of the vehicle.

Preferably this generator 30 is placed on a flexible cable controlling the speedometer or the input of the latter.

The lamps and their windows 1, 1' and 2, 2' are chosen of green color used conventionally for the "go" signal; by contrast the lamps and windows 3, 3' to 6, 6' are of red color and possibly of increasing intensity in order to give consciousness of danger. Moreover the contacts 1″ to 6″ are judiciously placed to control, with the aid of a contactor 29', the successive lighting of the first green window 1' then the second window 2' and at the same time the first red window 3' signalling the passing of the speed limit compatible with safety. Then the second green window 2' is extinguished simultaneously with the lighting of the second red window 4' signalling thus the exceeding of the threshold of safety; in case of increase of further speed, the other red windows light progressively without extinction of the preceding red windows augmenting strongly the luminous red surface and thus indicating the level of danger. In parallel with the last window, an audio signal 7 is advantageously provided.

In order to standardise to the maximum the fabrication of the apparatus, only the plate 8 supporting the contacts 1″ to 6″ need be replaced to adapt it to another type of vehicle. For this purpose, it will be placed in a position easily accessible.

This plate 8 supports the contacts in parallel grooves permitting for the same type of vehicle a regulation of the position of the safety threshold in accord with the driver's ability to achieve this, it includes reference marks 9 facilitating this regulation.

Thus made, the apparatus functions perfectly but only takes into account the element of speed, the type of vehicle and of the ability of the driver.

Other possibilities of dependence are easily obtained; for example a calibrated resistance 10 is put in series with the electromagnet 29, and certain portions of the resistance 10 can be short circuited, according to the conditions, which results in an increase of current in the electromagnet 29 necessitating a lowering of the speed of the vehicle to remain within the safety threshold.

For example a contact 11 connected by a connection A—A with an indicator 11' could short circuit a part of this resistance at night. This manoeuvre can be rendered automatic by a coupling with the control of the lighting of the vehicle or by the effect of a relay controlled by a photoelectric cell.

Another contact 12, having several positions and connected by a connection C—C with an indicator 12', can short circuit a zone whose size corresponds to the danger of the road. For example, the first position 13 (where nothing is short circuited) can be retained for motorways, the second position 14 for major roads, the third position 15 for normal roads, the fourth position 16 for difficult roads and so on.

Still another contact 17 connected by a connection B—B with an indicator 17' can short circuit another zone in order to lower the speed corresponding to the safety threshold when it rains, the roadway being rendered slippery. It is advantageous to couple this contact 17 either with the control of the windshield wiper, or with a system of relays linking with a hygrometer, these arrangements rendering it automatic.

The different points of connection of these contacts 11, 12 and 17 can be regulated, for example with the aid of collars 18, which can be displaced along the length of the resistance in a manner to adapt the apparatus to the capacities peculiar to the driver, which can be characterised following an appropriate medical examination. For example, if he sees badly at night the collar 18' should be stepped back, or if the rain hinders him much the collar 18" should similarly be stepped back. To this effect the support of the resistance 10 will have reference marks.

In this way an autonomous apparatus, rather complete, is obtained.

In a modification of the embodiment, the exterior windows of the vehicle can be coupled to the last red window 6' in order to signal to other road users the danger created by the vehicle.

In another modification, the lighting of the last red signal 6 can provoke by any known means a direct action on the speed of the vehicle, and can even cause it to stop.

In order to take into account the state of the vehicle in its principal critical points, several subordinate contacts 19, 19', 19" are placed in parallel and short circuit the assembly of the resistance 10 which reduces the speed or stops the vehicle. The critical points considered can be for example: the pressure in the brake canals and/or in the tires, the temperature of the oil, the closing of the doors, etc.

In another version of this apparatus, the zone of the resistance 10 short circuited by the contact 12 according to the conditions of the route, can in parallel, receive a signal of variable resistance 20 the resistance of which can be modified by different means according to the condition of the route being travelled.

One of these means comprises an apparatus 26 picking up the impulses or signals emitted by reference points 27 situated at the dangerous places along route 28 and at their approach, these reference points being as near to the zone as is judged dangerous.

These reference points 27 can be of any kind: fixed or transportable markers, reference points on the roadway or integral with the surfacing . . . ; their power of emission will be inversely proportional to the distance between the vehicle and the edge of the roadway.

It is thus possible to determine the position of the vehicle on a road.

Another means of lowering the resistance of the variable resistance 20 consists in reading into it the signal carried by a tape 21 pre-established as a function of the road and which unrolls itself progressively at a speed corresponding proportionally to that of the vehicle. The concentration of the signals of approach of dangerous points produces the transformed pulses by any known device 22 in a manner to lower the resistivity of the very low resistance 20.

This tape 21 can be of the type described in French Patent 1,366,849, that is to say constituted by a film 23 reproducing by any known process the particulars of the road signs 24 on an enlarged scale. In this case the reference marks or optical or magnetic signals intended to release the impulses for controlling the speed will be disposed marginally; optionally one can provide on this tape, at the side of the film of the route, a zone 25 reserved for the recording of safety commentaries accompanied by tourist commentaries or publicity with respect to the regions traversed.

One could also limit the illustrations carried on the tape to a few characteristic essentials regarding the safety of the route; for example the tape will comprise from place to place and at the appropriate places a reproduction of the road signs which appear with a sufficient advance progressively as the movement of the tape in a window equipped with an appropriate lighting system. This tape constitutes thus a programming of the itinerary determined in advance.

The description which precedes was given only by way of example of one particular non-limiting embodiment of the invention. One could thus, without departing from the limits of the invention, realise from some of the elements described various modifications of combinations.

What is claimed is:

1. Apparatus for indicating the degree of safety of an automobile comprising
   (A) at least one electric indicator lamp and an electric circuit for igniting and extinguishing said lamp,
   (B) a displaceable commutator device cooperating with at least one contact corresponding to said lamp, said commutator device and said contact being disposed in said electric circuit,
   (C) an electromagnet connected to said commutator device for controlling the position of the commutator device as a function of the supply current to the electromagnet, said supply current being provided by a generator driven at a speed proportional to the speed of the automobile,
   (D) and means for varying said supply current according to the safety conditions affecting the automobile.

2. Apparatus according to claim 1 including a plurality of electric indicator lamps and a plurality of contacts in said electric circuit, each contact corresponding to one lamp.

3. Apparatus according to claim 2 in which the position of the contacts is regulatable with respect to the commutator device whereby the contacts can be positioned to correspond to a particular driver's ability.

4. Apparatus according to claim 2 in which said means for varying the supply current to the electromagnet comprises a variable resistance connected in series with the electromagnet, there being short-circuiting means provided for short-circuiting zones of the variable resistance, each said short-circuiting means corresponding to a particular type of hazard, the size of the zone short-circuited by each short-circuiting means being regulatable.

5. Apparatus according to claim 4 in which a first short-circuiting means corresponds to the hazard of ambient darkness, a second short-circuiting means corresponds to the hazard due to the road conditions, and a third short-circuiting means corresponds to the hazard due to atmospheric conditions.

6. Apparatus according to claim 5 in which said first short-circuiting means is controlled by a switch controlling headlamps of the automobile, and said third short-circuiting means is controlled by a switch controlling wind-shield wipers of the automobile.

7. Apparatus according to claim 5 in which said second short-circuiting means is controlled by a pick-up device responsive to signals emitted from emitters located at danger points on the road.

8. Apparatus according to claim 5 in which said second short-circuiting means is controlled by a tape containing information concerning the road, the tape being scanned at a speed proportional to the speed of the vehicle.

9. Apparatus according to claim 4 including at least one auxiliary short circuiting means for short-circuiting the entire variable resistance, said auxiliary short-circuiting means being actuated by a failure of a corresponding component of the automobile.

10. Apparatus according to claim 2 including an audio indicator adapted to be actuated by the commutator device.

11. Apparatus according to claim 2 in which one of the indicator lamps is positioned so as to be visible to other road users.

12. Apparatus according to claim 2 including means for limiting the speed of the automobile when the last lamp is ignited.

References Cited

UNITED STATES PATENTS 2,284,633  6/1942  Bosch _____ 340—53

ALVIN H. WARING, Primary Examiner

U.S. Cl. X.R.

180—106; 340—62, 120